(12) United States Patent
Church et al.

(10) Patent No.: US 10,147,438 B2
(45) Date of Patent: Dec. 4, 2018

(54) ROLE MODELING IN CALL CENTERS AND WORK CENTERS

(71) Applicant: INTERNATIONAL BUSINESS MACHINES CORPORATION, Armonk, NY (US)

(72) Inventors: Kenneth W. Church, Dobbs Ferry, NY (US); Jason W. Pelecanos, Ossining, NY (US); Josef Vopicka, Prague (CZ); Weizhong Zhu, Hartsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/448,246

(22) Filed: Mar. 2, 2017

(65) Prior Publication Data
US 2018/0254051 A1 Sep. 6, 2018

(51) Int. Cl.
| | |
|---|---|
| G10L 15/04 | (2013.01) |
| G10L 21/028 | (2013.01) |
| G10L 15/06 | (2013.01) |
| G10L 17/00 | (2013.01) |
| H04M 3/51 | (2006.01) |

(52) U.S. Cl.
CPC ............ *G10L 21/028* (2013.01); *G10L 15/04* (2013.01); *G10L 15/063* (2013.01); *G10L 17/005* (2013.01); *H04M 3/51* (2013.01)

(58) Field of Classification Search
USPC .................. 704/235, 246, 247, 251, 252
See application file for complete search history.

(56) References Cited

U.S. PATENT DOCUMENTS

| | | | |
|---|---|---|---|
| 6,614,903 B1 | 9/2003 | Flockhart et al. | |
| 8,396,204 B2 | 3/2013 | Guerrero et al. | |
| 9,154,629 B2* | 10/2015 | John | H04M 3/56 |
| 9,460,722 B2* | 10/2016 | Sidi | G10L 17/02 |
| 9,491,295 B2 | 11/2016 | Shaffer et al. | |
| 9,704,103 B2* | 7/2017 | Suskind | G06N 99/005 |

(Continued)

FOREIGN PATENT DOCUMENTS

EP 949794 A1 10/1999

OTHER PUBLICATIONS

Barzilay et al., "The Rules Behind Roles: Identifying Speaker Role in Radio Broadcasts," Article, AAAI Proceedings, Copyright 2000, AAAI (www.aaai.org), pp. 1-6.

(Continued)

*Primary Examiner* — Leonard Saint Cyr
(74) *Attorney, Agent, or Firm* — Cantor Colburn LLP; Rahan Uddin

(57) ABSTRACT

Embodiments of the invention include method, systems and computer program products for role modeling. Aspects of the invention include receiving, by a processor, audio data, wherein the audio data includes a plurality of audio conversation for one or more speakers. The one or more segments for each of the plurality of audio conversations are partitioned. A speaker is associated with each of the one or more segments. The one or more segments for each of the plurality of audio conversations are labeled with roles utilizing a speaker recognition engine. Speakers are clustered based at least in part on a number of times the speakers are present in an audio conversation.

17 Claims, 4 Drawing Sheets

(56) References Cited

U.S. PATENT DOCUMENTS

| | | |
|---|---|---|
| 2006/0072739 A1 | 4/2006 | Baggenstoss et al. |
| 2007/0154007 A1 | 7/2007 | Bernhard |
| 2015/0025887 A1* | 1/2015 | Sidi .................. G10L 17/02 704/245 |
| 2017/0263245 A1* | 9/2017 | Mizumoto ............ G10L 15/265 |

OTHER PUBLICATIONS

Bigot et al., "Detecting individual role using features extracted from speaker diarization results," Multimedia Tools and Applications (Sep. 2012), published online Sep. 30, 2010, Springer Science+Business Media, LLC, 2010, pp. 1-24.

Glembek, et al., "Simplification and Optimization of I-Vector Extraction," 2011 IEEE, ICASSP 2011, pp. 4516-4519.

Lapidot et al., "Speaker Diarization in Commercial Calls", www.researchgate.net; Conference Paper, https://www.researchgate.net/publication/279202092, Conference Paper Jul. 2014, pp. 1-5.

Liu, Yang, "Initial Study on Automatic Identification of Speaker Role in Broadcast News Speech," Association for Computational Linguistics, Proceedings of the Human Lang. Technology Conf. of the North American Chap. of ACL, Jun. 2006, pp. 81-84.

Sapru et al., "Detecting speaker roles and topic changes in multi-party conversations using latent topic models," Interspeech, 2014, ISCA 2014, Sep. 14-18, 2014, Singapore, pp. 2882-2886.

Wang et al., "Automatic Identification of Speaker Role and Agreement/Disagreement in Broadcast Conversation," 2011 IEEE, ICASSP (2011) pp. 5556-5559.

* cited by examiner

ROLE MODELING IN CALL CENTERS AND WORK CENTERS

BACKGROUND

The present disclosure relates in general to role modeling and, more specifically, to methods, systems and computer program products for role modeling in call centers and work centers.

Diarization is a process of partitioning an inputted audio stream, consisting of two or more speakers, into different segments according to a speaker's identity (e.g., speaker 1 and speaker 2). In essence, diarization helps answer the question of "who spoke when?" Speech recognition techniques, such as automatic speech recognition (ASR), take an inputted audio stream containing a spoken language and translate this audio into text.

SUMMARY

Embodiments of the invention include a computer-implemented method for role modeling. The method includes receiving, by a processor, audio data, wherein the audio data includes a plurality of audio conversation for one or more speakers. The one or more segments for each of the plurality of audio conversations are partitioned. A speaker is associated with each of the one or more segments. The one or more segments for each of the plurality of audio conversations are labeled with roles utilizing a speaker recognition engine. Speakers are clustered based at least in part on a number of times the speakers are present in an audio conversation.

Embodiments of the invention include a computer system for role modeling. The computer system for role modeling includes a processor configured to perform a method. The method includes receiving, by the processor, audio data, wherein the audio data includes a plurality of audio conversation for one or more speakers. The one or more segments for each of the plurality of audio conversations are partitioned. A speaker is associated with each of the one or more segments. The one or more segments for each of the plurality of audio conversations are labeled with roles utilizing a speaker recognition engine. Speakers are clustered based at least in part on a number of times the speakers are present in an audio conversation.

Embodiments of the invention include a computer program product for role modeling. The computer program product includes a non-transitory computer readable storage medium having computer readable program code embodied therewith. The computer readable program code includes computer readable program code configured to perform a method. The method includes receiving, by a processor, audio data, wherein the audio data includes a plurality of audio conversation for one or more speakers. The one or more segments for each of the plurality of audio conversations are partitioned. A speaker is associated with each of the one or more segments. The one or more segments for each of the plurality of audio conversations are labeled with roles utilizing a speaker recognition engine. Speakers are clustered based at least in part on the number of times the speakers are present in an audio conversation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the invention, methods, systems and computer program products for role modeling are provided. Role modeling is the development of a model that can assign a role to a particular speaker in a conversation. In one or more embodiments of the present invention, methods for role modeling include utilizing diarization and speech to text (STT) to segment text for multiple phone conversations with one or more speaking parties. As applied to a call center scenario, the roles for the speakers can be that of a customer (C) and a customer service agent (A). Diarization can distinguish one speaker from another (e.g., S1 vs. S2). Utilizing speaker diarization, speaker recognition, and text classification, roles for each of the speakers can be determined when analyzing a large volume of calls for a call center where a customer service agent is speaking on multiple calls. Customer service agents can be identified by utilizing the assumption that the customer service agents speak on multiple calls at a call center. This is contrary to a customer who speaks on one or two calls when calling into a call center. By using speaker diarization and speaker recognition, labels can be applied to agents who appear on multiple calls to provide labelled training data. This labelled training data is utilized by a supervised or unsupervised classifier to develop a role classification model. The role classification model can be developed by a number of machine learning techniques, such as, for example, k-means clustering and the like. The role classification model is utilized to assign roles to customer service agents and customers from a single call.

Figure 1:
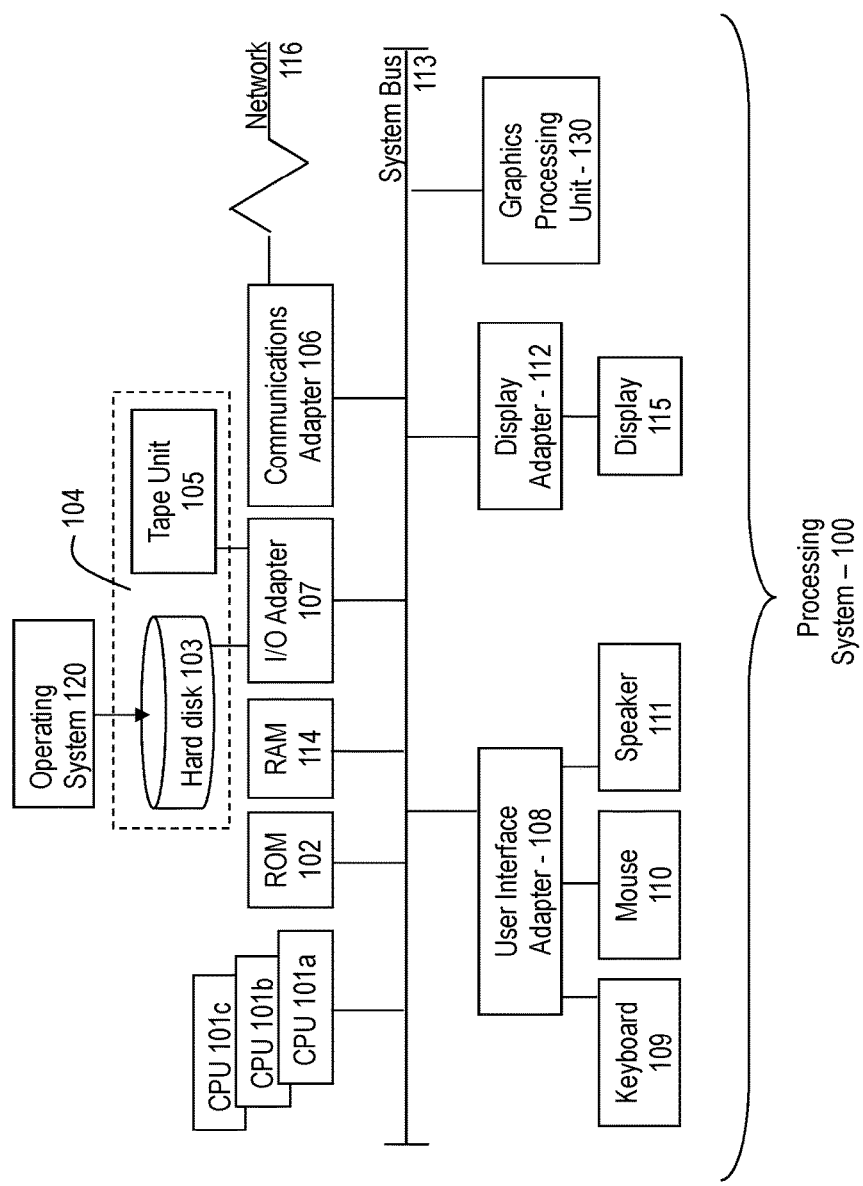
FIG. 1 illustrates a block diagram of a computer system for use in implementing one or more embodiments of the present invention.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one or more embodiments of the invention, each processor 101 can include a reduced instruction set computer (RISC) microprocessor. Processors 101 are coupled to system memory 114 and various other components via a system bus 113. Read only memory (ROM) 102 is coupled to the system bus 113 and can include a basic input/output system (BIOS), which controls certain basic functions of system 100.

FIG. 1 further depicts an input/output (I/O) adapter 107 and a network adapter 106 coupled to the system bus 113. I/O adapter 107 can be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 can be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which can include a graphics adapter to improve the performance of graphics intensive applications and a video controller. In one embodiment, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which can include, for example, a Super I/O chip integrating multiple device adapters into a single integrated circuit.

In one or more embodiments of the invention, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 2:
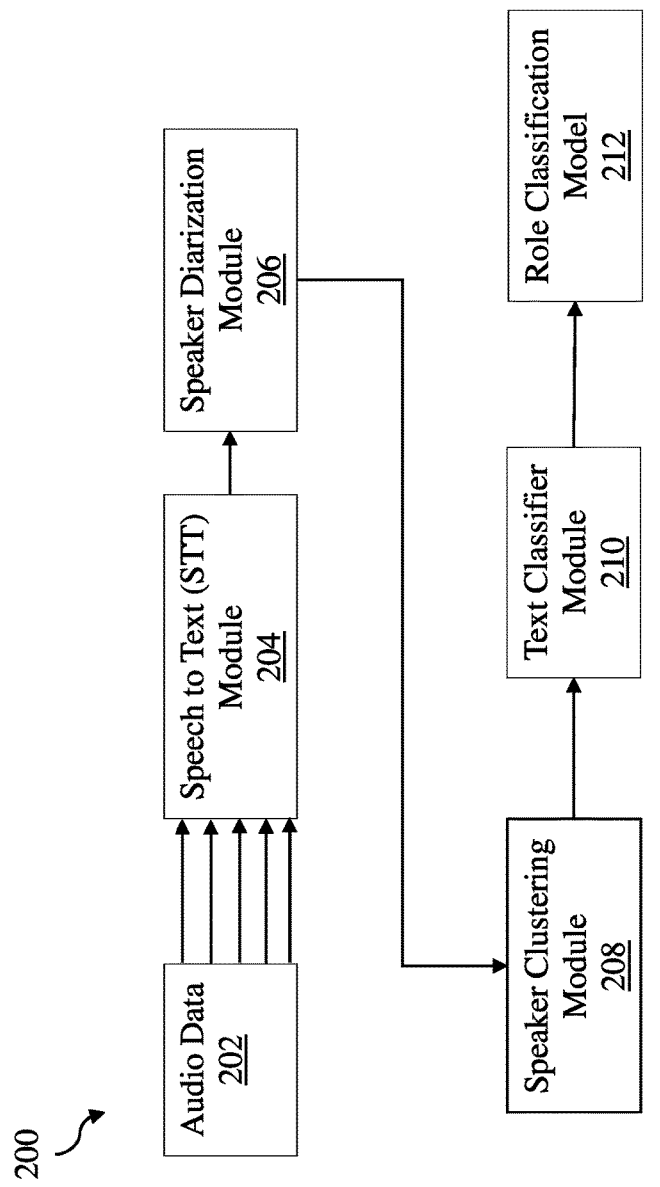
FIG. 2 illustrates a block diagram of a system for training a role classification model according to one or more embodiments of the present invention.

Referring to FIG. 2 there is shown a system 200 for training a role classification model according to one or more embodiments of the present invention. The system 200 includes audio data 202, a speech to text (STT) module 204, a speaker diarization module 206, a speaker clustering module 208, a role classifier module 210, and a role classification model 212.

In one or more embodiments of the invention, the modules 204, 206, 208, 210 can be implemented on the processing system 100 found in FIG. 1.

In one or more embodiments of the invention, the system 200 receives audio data 202 that includes either single speaker audio recordings or audio recordings of a conversation between two or more speakers. For example, an audio conversation in a customer service call center can be between a customer service representative (agent) and a customer calling in for customer service support (customer). The speech to text (STT) module 204 converts the audio conversations into a text format. The speaker diarization module 206 partitions the audio conversation text into segments and associates a speaker with each segment. For example, for an audio conversation text with two speakers, the speaker diarization module 206 can identify a speaker 1 (S1) and a speaker 2 (S2) and associate the partitioned segments with either S1 or S2 based on who is speaking at the time. In other words, diarization takes an audio input and outputs who is speaking when. The spoken text can then be associated with the corresponding speakers.

In one or more embodiments of the invention, the system 200 utilizes a speaker clustering module 208 to label roles of the different speakers (S1, S2) taken from the speaker diarization module 206. The speaker clustering module 208 utilizes clustering techniques to label or assign roles to the speakers. For example, the label (role) can be Agent or Customer as mentioned above in the customer service call center example. In an exemplary embodiment of the present invention, the clustering module 208 performs speaker clustering; however, many supervised and unsupervised machine learning techniques can be utilized to label unlabeled training data.

In one or more embodiments, the speaker clustering module 208 can utilize a speaker recognition engine to label or assign roles to the different speakers for the audio conversations in the audio data 202. In the call center example, the speaker recognition engine can start with a training set of k=10 audio conversations where there is a single agent that speaks on all k calls, and there are k different customers that speak on each of the k calls. Two-speaker diarization 206 is applied to each of the k calls. Speaker models or speaker representations (such as I-vectors) are trained on all clusters to produce a total of 20 models (or, in this case, i-vectors). Using agglomerative clustering, the 10 closest models are found after a constraint is considered. A constraint, for example, can be that only one i-vector from each call can be assigned in the 10 closest models group. This i-vector representation is used to directly detect (using speaker recognition techniques across a database of conversations) which speaker is the agent in the diarized text files. This process can be generalized to work in a more practical setting, where the system 200 starts with a corpus of calls from a call center, and finds agents by looking for speakers that speak on many calls.

In one or more embodiments of the present invention, the i-vector method starts with a large number of audio conversations from a source, such as a call center. For a call center, a customer service agent (Agent) can be distinguished from customers because agents speak on many of calls unlike a customer that tends to speak on just one call. Clustering techniques, such as k-means clustering, can be utilized to group i-vectors into a large number clusters, C, where |C| for example could be around 500 clusters. Most clusters tend to be associated with either agents or customers. The i-vector method can be used to associate a set of calls to each cluster. This set can be denoted as Calls(C[i]). The speaker diarization module 206 can be used to assign turns for each call to two speakers: S1 and S2.

In one or more embodiments of the present invention, a call in a call center will have an agent and a customer on each call. The i-vector method determines that S1 is the agent and S2 is the customer (or vice versa) by clustering over many calls in the call center. Since agents speak on many calls, and customers do not, the centroid for the i-vector for the agent should be similar to i-vectors found on many calls, unlike the centroid for the i-vector for the customer. This method assumes that the sample of calls from the call center includes a number of examples of the agent in question, and not too many calls from the customer in question.

In one or more embodiments of the present invention, the i-vectors are vectors of k floats (where k, in this case, is 64) which have been trained to distinguish speakers. Each i-vector corresponds to a few seconds of speech (e.g., roughly a speaker turn). I-vectors can be used for speaker recognition tasks because audio from the same speaker tends to produce i-vectors that are near one another, unlike audio from different speakers where the i-vectors tend to be far from one another. Clustering performance on i-vectors can be improved by utilizing Within Class Covariance Normalization (WCCN) and Unit Length Normalization (ULN) techniques to transform the i-vector. The WCCN matrix is estimated from training material and specific statistics are calculated for short segments representative of the expected duration of turns in the evaluation data. For clustering purposes, i-vector distances can be directly compared. Alternatively, the cosine distance can be used as well as Probabilistic Linear Discriminant Analysis.

The output of the speaker clustering module 208 utilizing the above described i-vector method is hypothesized speaker labels for the data. The text classifier module 210 can use both word unigrams and bigrams. Given labels from the speaker diarization module 204, a bag of words for the agent and a bag of words for the customers are created. These two bags can be input features for text classification and analysis utilizing a supervised machine learning tool, such as LibShortText. The text classifier module 210 learns which keywords are associated with agents and which are associated with customers.

The labelled training data includes the role of a speaker and the text for their speaker turn. Exemplary labelled training data is as follows:

Agent: How may I help you?
Customer: I need to open a ticket
Agent: Can you give me a brief problem description?

In this exemplary labelled training data, the strings to the left of the ":" are the roles and the words to the right of the ":" are features. Labelled training data can have |R| labels for each phone call, were R is the set of roles. In this example, R={customer, agent} has two elements. The words spoken by the agent are appended to a single line, and, similarly, all the words spoken by the customer are appended to a single line. The text classifier module 210 trains a role classification model 212 that can be applied to future calls.

To evaluate role classification performance, calls are divided into training (90% of calls) and testing (10% of calls) parts. Various features and techniques of LibShortText can be evaluated with the best configuration being selected. Because evaluating role classification performance involves obtaining customer/agent labels in a semi-supervised fashion (for example like the speaker diarization module 204), the analysis of role classification errors can be used to identify possible errors in the diarization process or it can identify calls with unusual content.

Figure 3:
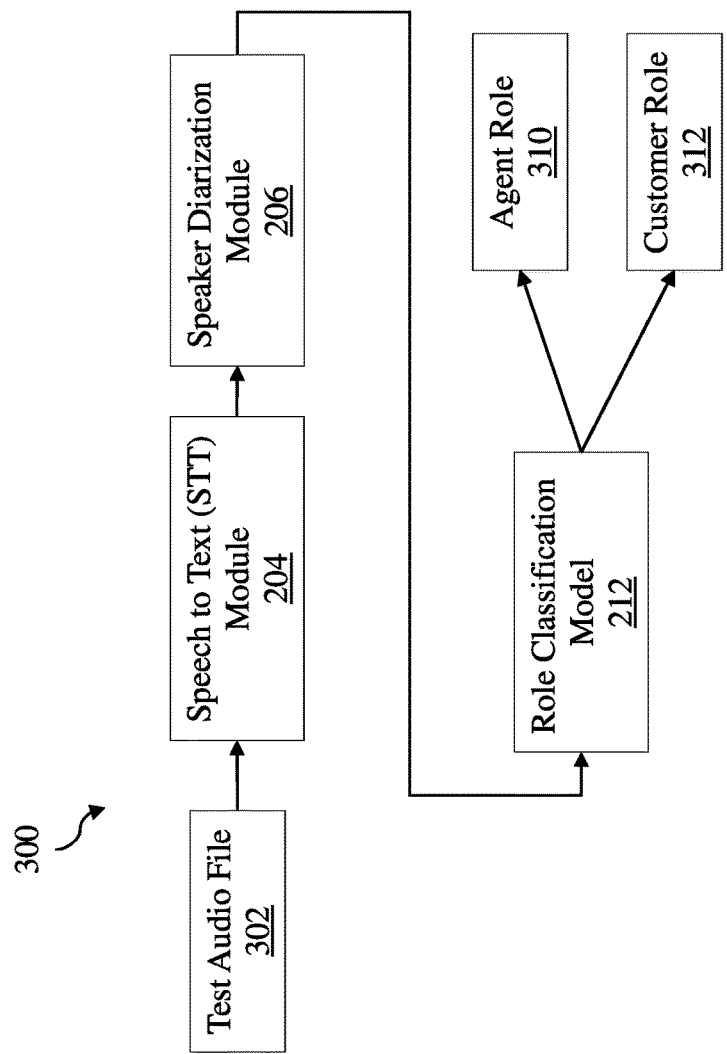
FIG. 3 illustrates a block diagram of a system for testing the classification model according to one or more embodiments of the present invention.

Referring to FIG. 3 there is shown a system 300 for testing the classification model according to one or more embodiments of the present invention. The system 300 includes test audio files 302, a speech to text module 204, a speaker diarization module 206, a role classification model 212. The role classification model 212 determines an agent role 310 and a customer role 312.

The system 300 can classify the roles based only on a single call independent of the agent. It is common for agents to use different words from customers. Agents are working from a well-rehearsed script unlike customers who are answering these questions for the first time. Automated speech recognition (ASR) word error rates tend to be higher for customers than agents, as well.

Simple keywords can be utilized for role modeling. For example, an agent is much more likely to use deferential words like "please", "sorry", and "sir". In certain data sets, customers are likely to be male and agents are likely to be female. Additionally, agents utilize certain technical words that customers are unlikely to know. Also, agents use words like "hold" and "transfer" more often than customers.

In one or more embodiments of the present invention, keywords, such as the name of an agent (name feature), can be utilized for role modeling. Agents introduce themselves at the beginning of a call. For example, a call may begin with, "Hello, my name is George P. Burdell. How can I help you?" A customer may respond by addressing the agent by his or her name before answering the question posed by the agent. The name feature is utilized for role modeling for the agent, George. Additionally, the name feature can be used to estimate error rates for the i-vectors.

In an alternate embodiment of the present invention, the text classification module 208 can be utilized for additional tasks beyond developing role classification models 212. Given cues from the call center meta-data and information from speaker diarization, other text classification tasks can be performed. For example, agents follow particular scripted procedures. Given which script the agent is following, a text classifier can learn the script specific words the agents speak. Additional classifiers can be trained utilizing other feature data such as demographics. Demographic labels for the audio data can be obtained by a few means. One approach is to utilize existing anonymized reference material maintained by the call center. Another approach is to have human listeners label the recordings to provide broad age or other demographics estimates (e.g., young, adult, senior citizen).

Figure 4:
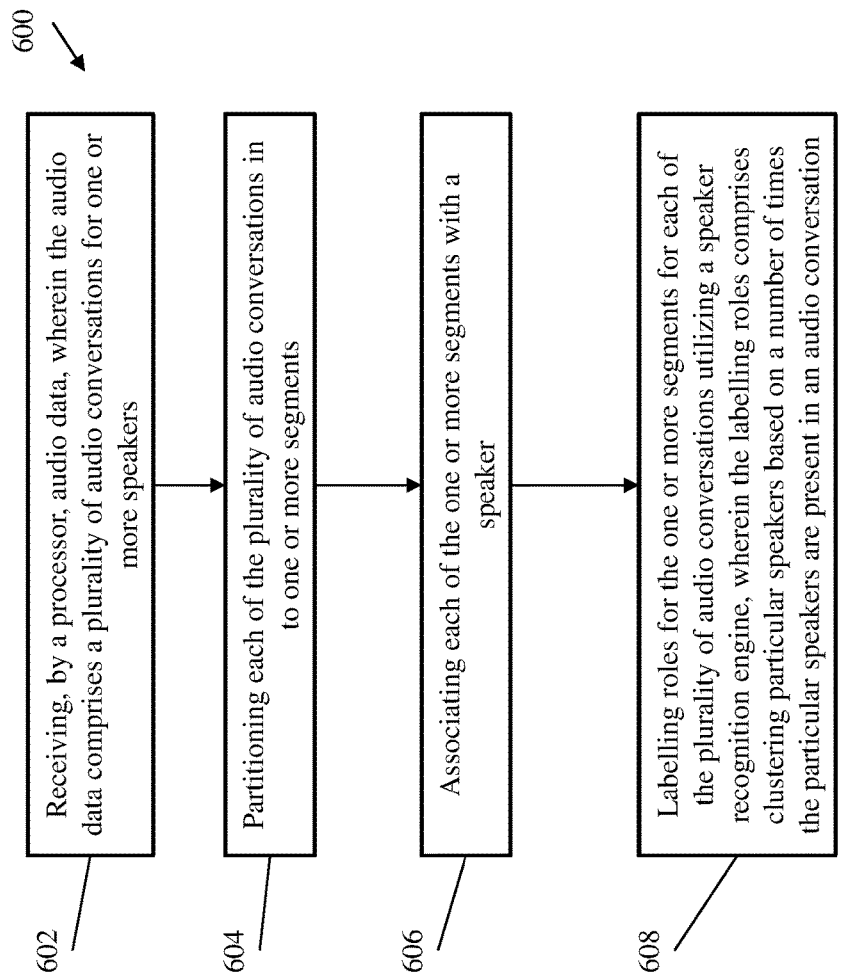
FIG. 4 illustrates a flow diagram of a method for role modeling in accordance with one or more embodiments.

Referring now to FIG. 4 there is shown a flow diagram of a method 600 for role modeling according to one or more embodiments. The method 600 includes receiving, by a processor, audio data, wherein the audio data includes a plurality of audio conversations for one or more speakers, as shown at block 602. The method 600, at block 604, includes partitioning each of the plurality of audio conversations in to one or more segments. At block 606, the method 600 includes associating each of the one or more segments with a speaker. The method 600 includes labelling roles for the one or more segments for each of the plurality of audio conversations utilizing a speaker recognition engine, wherein the labelling roles includes clustering particular speakers based on a number of times the particular speakers are present in an audio conversation.

Additional processes may also be included. It should be understood that the processes depicted in FIG. 6 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for role modeling, the method comprising:
   receiving, by a processor, audio data, wherein the audio data comprises a plurality of audio conversations for one or more speakers;
   partitioning each of the plurality audio conversations in to one or more segments;
   associating each of the one or more segments with a speaker;
   labelling roles for the one or more segments for each of the plurality of audio conversations utilizing a speaker recognition engine, wherein the labelling roles comprises clustering speakers based at least in part on a number of times the speakers are present in an audio conversation, word error rates the one or more speakers, and demographics of the one or more speakers;

converting each of the one or more segments to text;
training a text classifier utilizing the labelled roles; and
creating a role classification model based at least in part on the text classifier, wherein the role classification model determines a role for each of the one or more speakers.

2. The method of claim 1 further comprising:
receiving first audio data comprising a first audio conversation between a first speaker and a second speaker;
partitioning the audio into one or more segments and associating each of the one or more segments with one or both of the first speaker and the second speaker; and
determining a first role of the first speaker based at least in part on the role classification model.

3. The method of claim 2 further comprising determining a second role of the second speaker based at least in part on the role classification model.

4. The method of claim 3, wherein the first role is a customer service representative and the second role is a customer.

5. The method of claim 2 further comprising determining a first speaker identity associated with the first speaker.

6. The method of claim 3 further comprising determining a second speaker identity associated with the second speaker.

7. The method of claim 1, wherein the speaker recognition engine comprises an i-vector model.

8. A system for role modeling, the system having one or more processors coupled to a memory, the one or more processors configured to:
receive audio data, wherein the audio data comprises a plurality of audio conversations for one or more speakers;
partition each of the plurality audio conversations into one or more segments;
associate each of the one or more segments with a speaker;
label roles for the one or more segments for each of the plurality of audio conversations utilizing a speaker recognition engine, wherein the labelling roles comprises clustering speakers based on a number of times the speakers are present in an audio conversation, word error rates of the one or more speakers, and demographics of the one or more speakers;
convert each of the one or more segments to text;
train a text classifier utilizing the labelled roles; and
create a role classification model based at least in part on the text classifier, wherein the role classification model determines a role for each of the one or more speakers.

9. The system of claim 8, wherein the processor is further configured to:
receive first audio data comprising a first audio conversation between a first speaker and a second speaker;
partition the first audio conversation in to one or more segments and associating each of the one or more segments with one or both of the first speaker and the second speaker; and
determine a first role of the first speaker based at least in part on the role classification model.

10. The system of claim 9, wherein the processor is further configured to determine a second role of the second speaker based at least in part on the role classification model.

11. The system of claim 10, wherein the first role is a customer service representative and the second role is a customer.

12. The system of claim 9, wherein the processor is further configured to determining a speaker identity associated with the first speaker.

13. A computer program product for role modeling, the computer program product comprising a non-transitory computer readable storage medium having program instructions embodied therewith, the program instructions executable by a processor to cause the processor to perform:
receiving, by a processor, audio data, wherein the audio data comprises a plurality of audio conversations for one or more speakers;
partitioning each of the plurality audio conversations in to one or more segments;
associating each of the one or more segments with a speaker;
labelling roles for the one or more segments for each of the plurality of audio conversations utilizing a speaker recognition engine, wherein the labelling roles comprises clustering speakers based on a number of times the speakers are present in an audio conversation, word error rates of the one or more speakers, and demographics of the one or more speakers;
converting each of the one or more segments to text;
training a text classifier utilizing the labelled roles; and
creating a role classification model based at least in part on the text classifier, wherein the role classification model determines a role for each of the one or more speakers.

14. The computer program product of claim 13, further comprising:
receiving first audio data comprising a first audio conversation between a first speaker and a second speaker;
partitioning the first audio conversation in to one or more segments and associating each of the one or more segments with one or both of the first speaker and the second speaker; and
determining a first role of the first speaker based at least in part on the role classification model.

15. The computer program product of claim 14, further comprising determining a second role of the second speaker based on the role classification model.

16. The computer program product of claim 15, wherein the first role is a customer service representative and the second role is a customer.

17. The computer program product of claim 14, further comprising determining a speaker identity associated with the first speaker.

* * * * *